United States Patent [19]

Vaughan et al.

[11] 4,216,297

[45] Aug. 5, 1980

[54] VINYL POLYBUTADIENE BISIMIDE COPOLYMERS

[75] Inventors: Robert W. Vaughan; Michael K. O'Rell, both of Manhattan Beach, Calif.; Clyde H. Sheppard, Bellevue, Wash.

[73] Assignee: TRW Inc., Redondo Beach, Calif.

[21] Appl. No.: 877,127

[22] Filed: Feb. 13, 1978

[51] Int. Cl.$^2$ ................................................ C08F 8/30
[52] U.S. Cl. .................................... 525/334; 525/345; 525/348; 525/375
[58] Field of Search .................. 526/50; 525/334, 345, 525/348, 375

[56] References Cited

U.S. PATENT DOCUMENTS

| | | | |
|---|---|---|---|
| 3,557,066 | 1/1971 | Cohen et al. | 526/50 |
| 3,778,418 | 12/1973 | Nakayama | 526/50 |
| 3,931,354 | 1/1976 | Sheppard et al. | 260/836 |
| 4,009,228 | 2/1977 | Tazuma et al. | 526/50 |

*Primary Examiner*—William F. Hamrock
*Attorney, Agent, or Firm*—Christie, Parker & Hale

[57] ABSTRACT

Vinyl polybutadiene bisimide copolymers which are peroxide curable are provided by two methods of formation. In the first method a bisimide cross-linked vinyl polybutadiene prepolymer is formed by combining a high vinyl content polybutadiene providing pendant vinyl groups with a bisimide in the presence of a first free radical initiating catalyst. The resultant cross-linked prepolymer is cured to a hard resin by the formation of additional cross-linkages through the pendant vinyl groups by heating the prepolymer to a temperature of at least about 300° F. in the presence of a second free radical initiating catalyst. The second method discloses a method wherein the bisimide cross-linkages are formed in situ. In the second method, a high vinyl content polybutadiene providing pendant vinyl groups is reacted with maleic anhydride to form a maleic anhydride vinyl polybutadiene adduct. The adduct is subsequently combined with an aromatic polyamine and a free radical initiating catalyst. The mixture is heated to about 250° F. to form a prepolymer having bisimide cross-linkages between the vinyl polybutadiene backbone segments. By continuing to heat the prepolymer to at least about 300° F. still in the presence of the free radical initiating catalyst, the prepolymer is cured to a hard resin by the formation of cross-linkages between the pendant vinyl groups.

9 Claims, 3 Drawing Figures

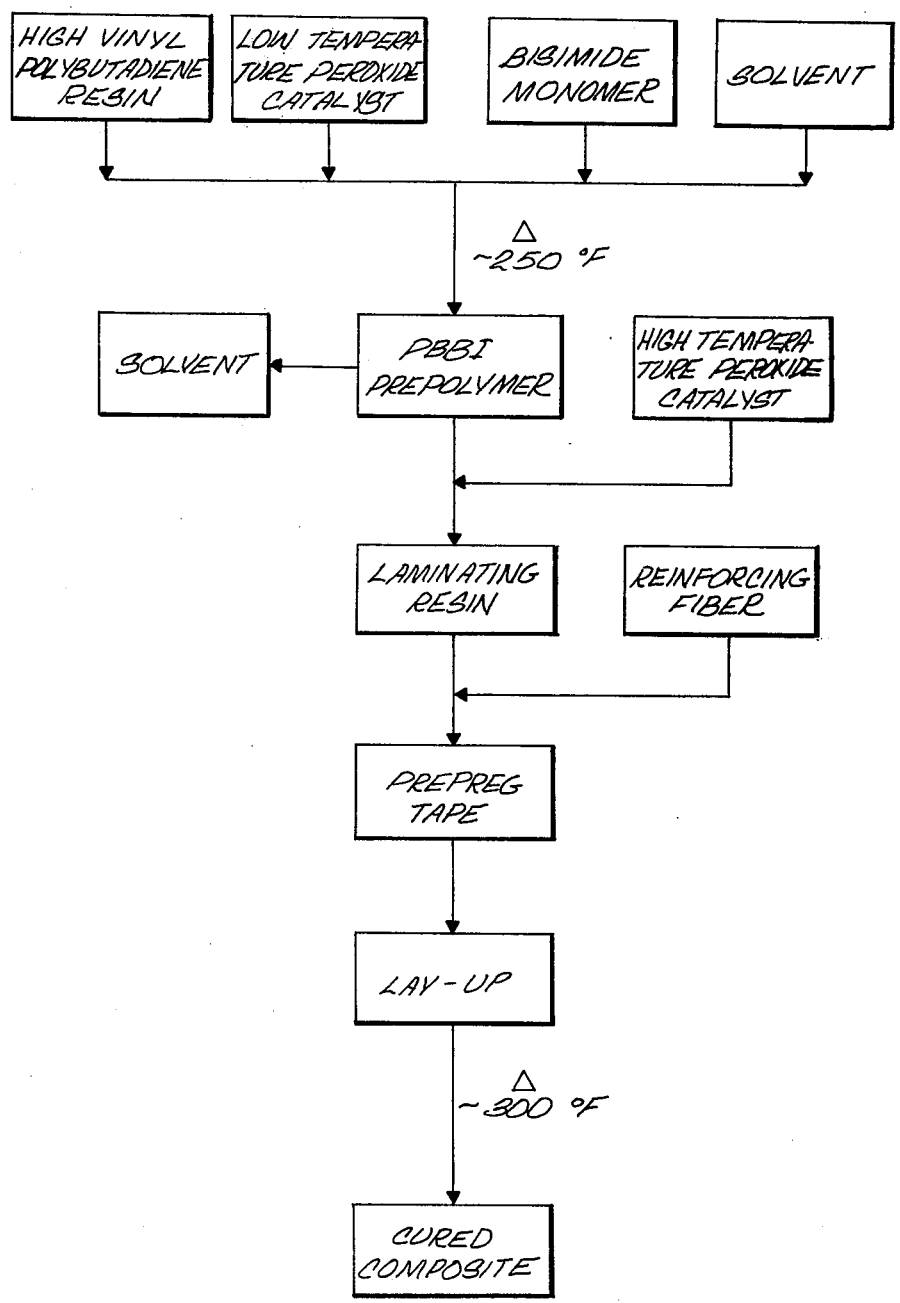

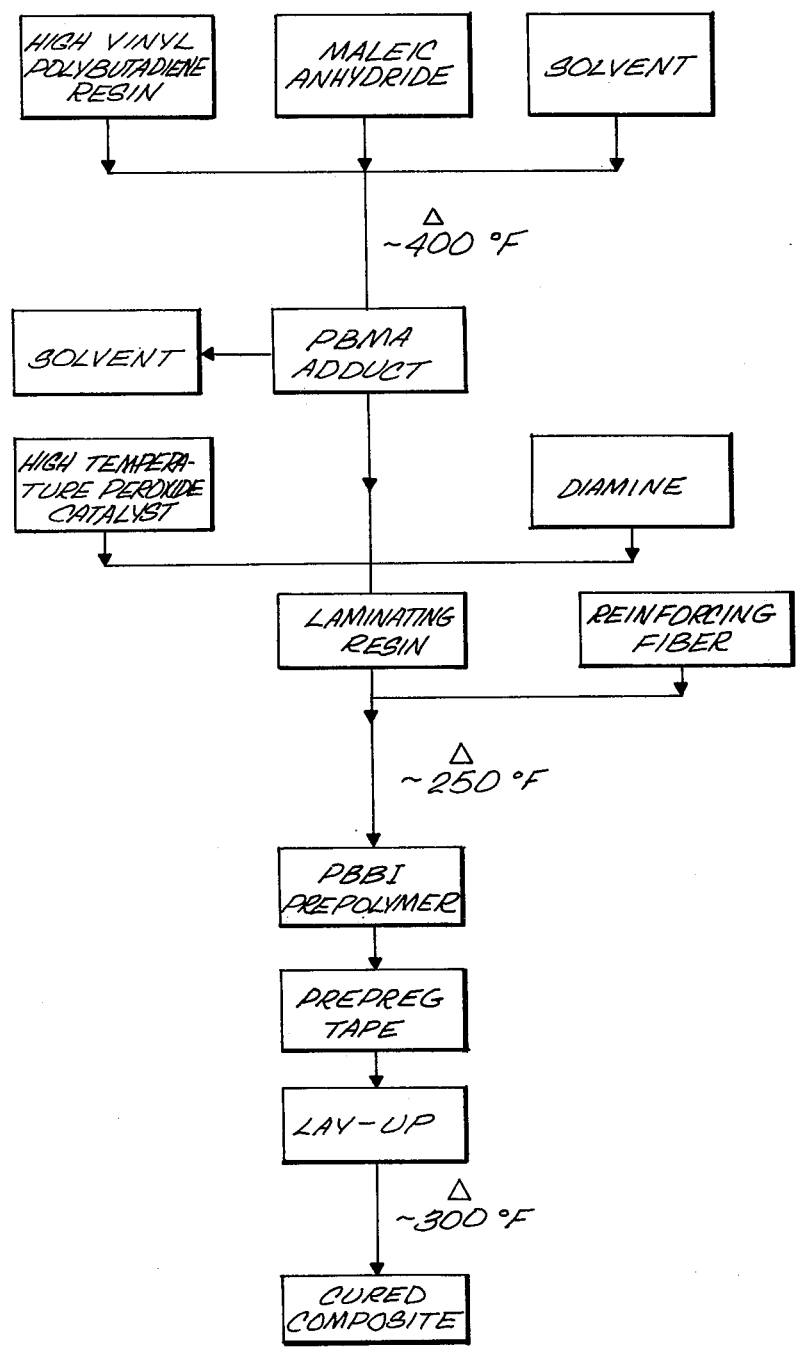

VINYL POLYBUTADIENE BISIMIDE COPOLYMERS

The Government has rights in this invention pursuant to Contract (or Grant) No. F33615-76-C-5226 awarded by the Department of the Air Force.

BACKGROUND OF THE INVENTION

The present invention is directed to vinyl polymerizable systems which when cured exhibit strength retention properties at elevated temperatures under moist conditions.

Composite materials are finding ever increasing utility in the structural engineering art. Emphasis is being placed on developing new composites and improved methods and resin systems for binding and holding the composite reinforcing materials together.

While epoxy resins are the most popular, three major deficiencies have become apparent with regard to the state-of-the-art epoxy resin systems for use as composite matrices.

First is the high amount of resin flow during molding which can be as much as 50 percent of the original resin content. High resin flow may be attributed in some instances to the fact that some epoxy resins are liquid and flow during molding, while in other instances the epoxy resins require a solvent carrier and retain the solvent during manufacture of the resinous article.

Second is the requirement for use of autoclaves to provide the essential pressure necessary for the consolidation of resin bound complex parts. This requirement for pressure greatly limits the number of vendors capable of handling the epoxy resins.

Third is their propensity to absorb moisture which is deleterious to the mechanical properties of high performance structural composites. It has been determined this results principally from absorption of moisture by the epoxy resin matrix. It has further been found that the presence of moisture has more of an influence on mechanical property degradation in glass fiber reinforced composites than for graphite fiber reinforced composites using the same epoxy resin system.

There are two modes of property degradation: initial reversible degradation resulting from plasticization of the epoxy resin matrix by the absorbed moisture and permanent degradation resulting from cracks in the epoxy resin matrix. The initial degradation can be predicted in neat epoxy resin castings based on standard diffusion models. However, the permanent degradation in composites cannot be predicted in any straightforward manner and is influenced by thermal peaks during exposure. A need has existed to provide resin systems for composite structures that do not undergo moisture degradation.

Ideally, such resin should provide the optimum moisture resistance; i.e., be hydrophobic. This feature must be achieved while maintaining suitability to processing by conventional technology and provide satisfactory strength retention at elevated temperatures.

High vinyl content polybutadiene resins provide a base to induce hydrophobic properties. They exhibit, however, several deficiencies. The specific deficiencies are low adhesion to graphite and glass fibers, low elongation and a sharp drop in strength retention at moderately elevated temperatures of about 300° F.

These deficiencies generally were countered by outstanding electrical properties and chemical resistance. Another advantage is that vinyl polybutadiene polymerization can be imparted at low resin flow; i.e., rapid gelation.

High vinyl content polybutadiene modified epoxy resins (hereinafter referred to as epoxy-polybutadiene copolymers) have been provided and are disclosed in U.S. Pat. No. 3,931,354, incorporated herein by reference. The epoxy-polybutadiene copolymer approach provides a compromise in which the excellent 350° F. mechanical properties of the epoxy resins were to be in combination with the hydrophobic character of the vinyl polybutadiene resin. The epoxy-polybutadiene copolymers generally provided acceptable dry strength retention up to about 350° F. While hydrophobic characteristics are imparted by the polybutadiene moiety such copolymer resin systems, although having a higher strength retention than conventional epoxy resins, were found to exhibit a drop in strength retention on exposure to moisture.

In sum, while suited to low temperature performance, the resin systems of U.S. Pat. No. 3,931,354 fall short of desired retention of strength at elevated temperatures in the presence of moisture.

SUMMARY OF THE INVENTION

According to the present invention, there is provided novel bisimide linked high vinyl polybutadiene resins which cure through pendant vinyl groups in the presence of suitable peroxide catalyst at temperatures of about 300° F. or more, preferably about 350° F. or more. The resins are particularly useful in preparing fiber reinforced resin composites which exhibit a high degree of wet strength retention at temperatures of about 350° F. or more.

The peroxide curable compositions of this invention are provided by two routes or their combination. In one route, termed the prepolymer approach, they comprise at least one polybutadiene bisimide copolymer providing pendant vinyl groups capable of high temperature peroxide cure and which include copolymer graft segments of the structure:

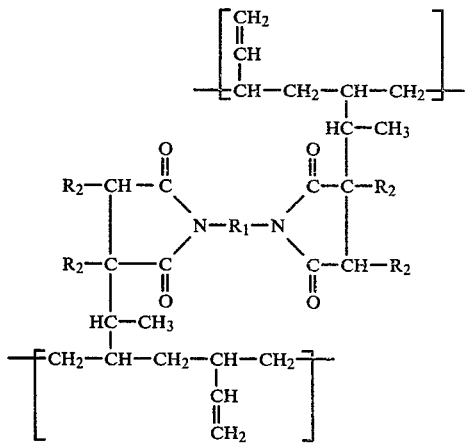

wherein $R_1$ is the difunctional benzenoid radical

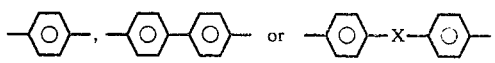

wherein X is —O—, —S—, —SO₂—, —CH₂—, —C₂H₄—, —CO—, —C₃H₆—, or

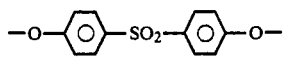

and wherein $R_2$ is independently hydrogen, an aliphatic group containing 1 or 2 carbon atoms, a benzenoid radical or a halogen.

As indicated, the grafts occur at at least the 1,2 polybutadiene segments of polybutadiene backbone resin, leaving a high degree of pendant vinyl groups for peroxide cure. The 1,2 polybutadiene segments comprise about 90% or more of the total unsaturation, the balance being 1,4 polybutadiene segments which provides an alternate or additive route of providing the bisimide grafts.

In the alternate route, termed the in situ approach, the peroxide curable resins comprise at least one polybutadiene bisimide copolymer providing pendant vinyl groups capable of high temperature peroxide cure and including copolymer graft segments of the structure:

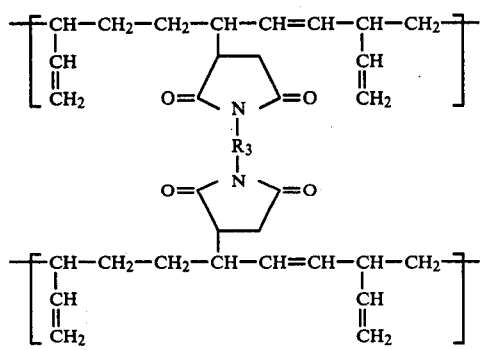

and wherein the copolymer is formed in situ at temperatures of at least about 250° F., by the reaction of an adduct having sections of the structure:

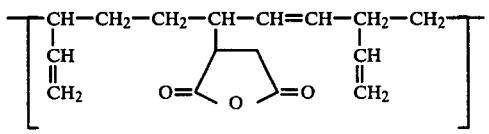

with an aromatic polyamine such as those having the general formula:

$$H_2N—R_3—NH_2$$

wherein $R_3$ is the difunctional benzenoid radical

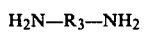

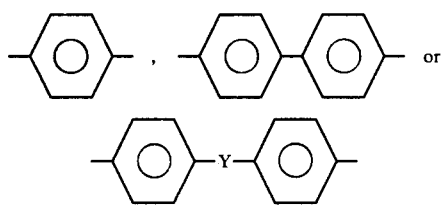

and wherein Y is —O—, —S—, —SO₂—, —CH₂—, —C₂H₄—, —CO—, —C₃H₆—,

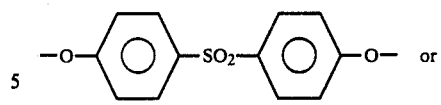

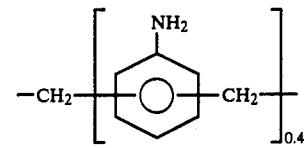

The adduct is the reaction product of 1,4 polybutadiene segments of vinyl polybutadiene and maleic anhydride in a solvent at about at least 400° F.

The grafts occur at the 1,4 polybutadiene segments of polybutadiene backbone resin leaving a high degree of pendant vinyl groups for high temperature peroxide cure.

Mixtures of the compositions of this invention provided by the two routes of formation may also be employed. The available pendant vinyl groups in the compositions provided by both the prepolymer approach and the in situ approach will undergo cure in the presence of peroxide capable of initiating free radical cure at a temperature of at least about 300° F., preferably 350° F., and by heating to a temperature at which cure is initiated.

The resin composition of this invention permits atmospheric pressure cure and provides upon cure hydrophobic resins which exhibit a high degree of wet strength retention at 350° F. Such properties are attributed to the combination of the polybutadiene backbone and the bisimide grafts across the backbone.

THE DRAWINGS

FIG. 2 is a block diagram illustrating the preparation of composite laminates employing prepolymers of polybutadiene and the bisimides; and FIG. 3 is a block diagram illustrating the preparation of composite laminates where the bisimide grafts are formed in situ.

DETAILED DESCRIPTION OF THE INVENTION

Figure 1:
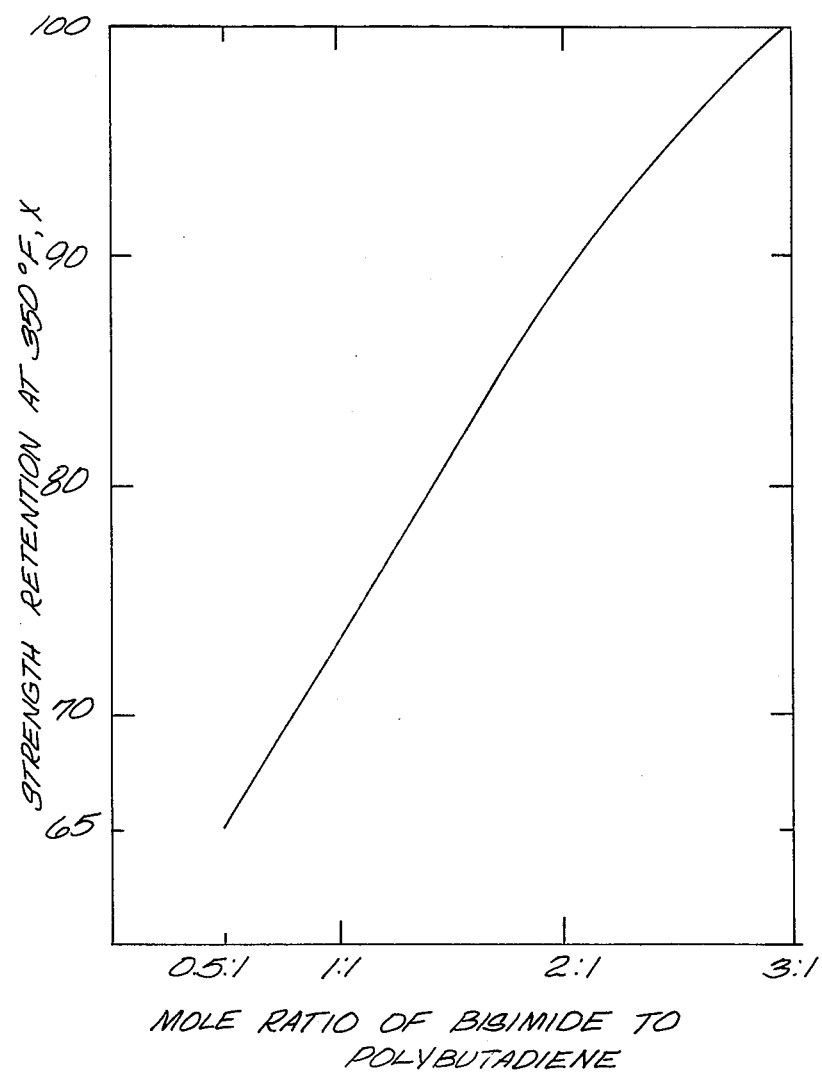
FIG. 1 illustrates wet strength retention of the resins of this invention at 350° F. as a function of the bisimide polybutadiene mole ratio of the cured resin.

The present invention is directed to novel bisimide linked, high vinyl content polybutadiene resins which cure through pendant vinyl groups in the presence of suitable peroxide catalysts at elevated temperatures. The resins of this invention are particularly useful in the fabrication of fiber reinforced resin composites.

The vinyl polybutadiene polymers (hereinafter sometimes referred to as PB) contemplated for use in the resin compositions of this invention can be either terminated or unterminated vinyl polybutadiene polymers. When terminated vinyl polybutadiene polymers are employed, terminal groups can include hydroxyl groups, carboxyl groups, epoxy groups and the like. The vinyl polybutadiene polymers useful in the production of the resin compositions of this invention comprise at least about 90% 1,2 polybutadiene configuration, the balance of the unsaturation being 1,4 polybutadiene configuration. While the molecular weight of the vinyl polybutadiene polymers does not present critical consideration, it is preferred that the molecular weight of the vinyl polybutadiene polymers range from about 500 to about 5,000. Higher molecular weight polymers may also be used. The vinyl polybutadiene polymer component provides the backbone structure for the resin compositions of this invention.

The bisimide component (hereinafter sometimes referred to as BI) grafts onto the backbone structure of the resin to be formed by this invention providing cross-linking between vinyl polybutadiene backbone structures. The cross-linking through the bisimide polymer can be provided in a prepolymer prior to utilization of the copolymer resin or can be provided in situ during the utilization of the copolymer resin.

There are two methods for preparing the resins of this invention. The methods can be employed alternatively or in combination.

One method, the prepolymer method, is conducted by reacting a high vinyl content polybutadiene with a bisimide in the presence of a low temperature free radical initiating catalyst at temperatures from about 250° F. to below about 300° F. to form a vinyl polybutadiene bisimide prepolymer.

The other method, termed the in situ method, is conducted by first preparing an adduct from a high vinyl content polybutadiene resin and maleic anhydride (hereinafter sometimes referred to as MA), and secondly forming a bisimide cross-linkage in situ by reacting the PBMA adduct with an aromatic polyamide at temperatures of about 250° F. to below about 300° F.

The prepolymer method comprises reacting a vinyl polybutadiene polymer with a bisimide in the presence of a low temperature free radical initiating catalyst to form a prepolymer consisting of vinyl polybutadiene backbone structure with bisimide cross-linking and pendant vinyl groups. The bisimides that are useful in the prepolymer method of synthesis of the resin compositions of this invention have the general structure:

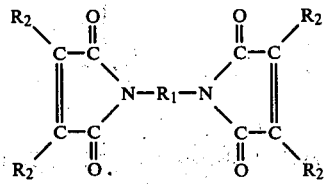

wherein $R_1$ is a difunctional benzenoid radical selected from the group consisting of

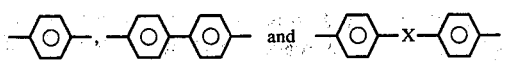

wherein X is selected from the group consisting of —O—, —S—, —SO$_2$—, —CH$_2$—, —C$_2$H$_4$—, —CO—, —C$_3$H$_6$—and

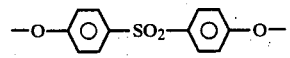

and wherein $R_2$ is independently hydrogen, an aliphatic group containing 1 or 2 carbon atoms, a benzenoid radical or a halogen.

The bisimide will react with the vinyl polybutadiene at any segment. The prepolymer is formed by a free radical mechanism in which an initiating free radical forms a free radical on one of the pendant vinyl groups. Generally, this reaction occurs at about 250° F. to below about 300° F. under conditions which substantially prevent the formation of cross-linking between the pendant vinyl groups on the vinyl polybutadiene backbone structures. At temperatures of 300° F. or more, preferably 350° F., cross-linking through the pendant vinyl groups will be induced to yield a final thermoset resin. Free radical reactions are initiated by at least an organic peroxide free radical initiator selected from the following:

di-t-butyl peroxide
n-butyl-4,4-bis(tertiary butylperoxy)valerate
2,5-dimethyl-2,5-bis(tertiary butylperoxy)hexane
t-butyl perbenzoate
dicumyl peroxide
methyl ethyl ketone peroxide
cumene hydroperoxide
di-n-methyl-t-butyl percarbamate
lauroyl peroxide
acetyl peroxide
decanoyl peroxide
t-butyl peracetate
t-butyl peroxyisobutyrate The peroxides are selected depending on whether the low temperature graft polymerization or high temperature vinyl polymerization is to be perfected. The preferred catalysts for formation of the graft prepolymer is t-butyl perbenzoate while the preferred catalyst for vinyl cure is 2,5-dimethyl-2,5-bis(tertiary butylperoxy)-hexane.

To form the prepolymer, the vinyl polybutadiene free radical attacks a bisimide molecule thereby providing a resultant free radical on the bisimide moiety. The bisimide can be attached to either of the carbon atoms in the pendant vinyl group that has formed such a free radical. Based upon the order of stability of free radicals, the imide will generally be attached to the secondary carbon. However, attachment to the secondary carbon exhibits increased stearic hindrance and increases the probability of attachment also at the primary carbon atom. The —OR moiety of the free radical initiator is shown in the following schematic on the primary carbon of the vinyl group linkage between the bisimide and the vinyl polybutadiene. Within the free radical environment of the mechanism for forming the prepolymer the —OR moiety can be abstracted and replaced with hydrogen thereby forming a methyl group. Although the precise reaction sequence is not known, it is believed that a hydrogen radical is transferred from a second vinyl polybutadiene polymer to the bisimide moiety and a subsequent analogous reaction occurs between the second vinyl polybutadiene and bisimide which results in a cross-link. The reaction sequence and mechanism for the 1,2 polybutadiene segments are presented in the following schematic:

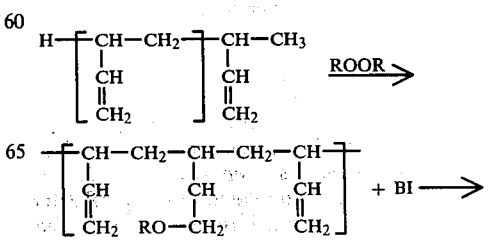

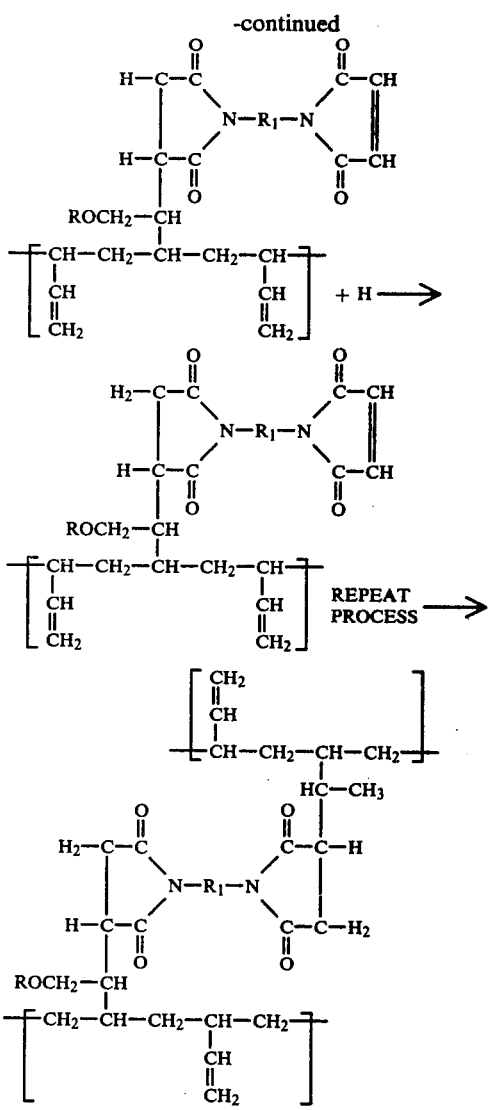

The prepolymer, having the above general structure of vinyl polybutadiene bisimide copolymer is cured through the pendant vinyl groups. The curing reaction consists of a free radical mechanism wherein there is formed cross-linking between the vinyl polybutadiene backbone structures through the pendant vinyl groups. The prepolymer is reacted with a second free radical initiator suitable to bring about the cure and cross-linking of the pendant vinyl groups at a temperature of at least about 300° F., preferably about 350° F. or more. Such a high temperature free radical initiator peroxide can be any convenient free radical such as an organic peroxide selected from the above list of organic peroxides. The peroxide is employed in from about 2 to about 20%, preferably 2 to about 10% by weight of the resin and monomer in forming the prepolymer or by weight of the PBBI prepolymer for vinyl cure.

The prepolymer method of synthesis of a peroxide curable resin composition of this invention and the preparation of a cured composite is illustrated in FIG. 2. With reference to FIG. 2 a high vinyl polybutadiene is reacted with a bisimide in the presence of a free radical initiator catalyst in a suitable solvent at about 250° F. There is formed a vinyl polybutadiene bisimide (PBBI) prepolymer. A laminating resin is prepared from the PBBI prepolymer and a second free radical initiator. A prepreg tape is provided by adding reinforcing fiber to the laminating resin. The prepreg tape is formed such as by layering to provide a composite panel. The laminating resin is cured by heating to about 300° F. Curing consists of the formation of cross-linkages between the pendant vinyl groups on the vinyl polybutadiene backbone structure of the PBBI copolymer. The curing reaction is catalyzed by the second free radical initiator.

The in situ method of synthesis of the resin compositions of this invention comprises preparing an adduct from a high vinyl content polybutadiene and an acid anhydride, specifically maleic anhydride. The adduct is formed by reacting a mixture of vinyl polybutadiene and maleic anhydride in a suitable solvent at about 400° F. The flow diagram of FIG. 3 illustrates the in situ method of synthesis of a resin composition and formation of a composite therefrom.

The maleic anhydride will graft only onto the backbone at the 1,4 polybutadiene unsaturated segments. The amount of cross-linking provided by the in situ method is therefore limited by the availability of 1,4 polybutadiene segments in the vinyl polybutadiene polymer. It is preferred to use one mole of maleic anhydride per 1,4 polybutadiene segment.

The following reaction sequence shows the formation of the polybutadiene maleic anhydride (PBMA) adduct and the grafting of the maleic anhydride to the 1,4 polybutadiene segments.

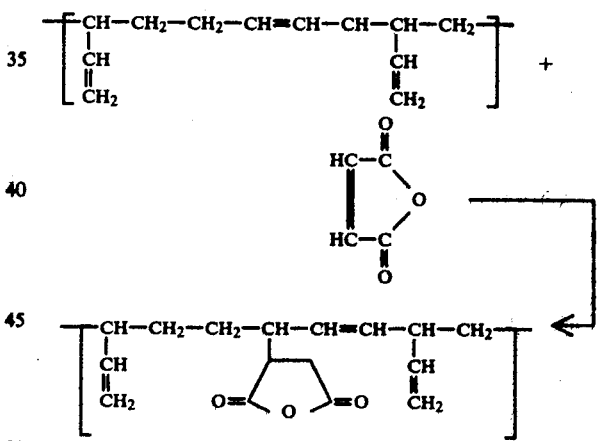

This PBMA adduct is capable of forming bisimide cross-linking when reacted at about 250° F. with an aromatic polyamine having the general formula:

H$_2$N—R$_3$—NH$_2$ wherein R$_3$ is selected from the group consisting of:

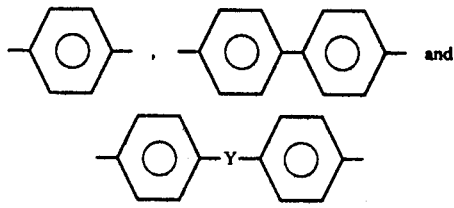

and wherein Y is selected from the group consisting of: —O—, —S—, —SO$_2$—, —CH$_2$—, —C$_2$H$_4$—, —CO—, —C$_3$H$_6$—,

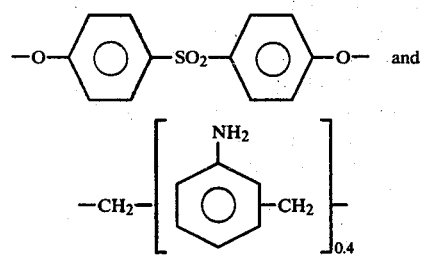

However, the bisimide cross-linking need not be formed until desired, i.e., in situ. It is preferred to use about 0.5 moles of aromatic polyamine per mole of maleic anhydride. The reaction between the PBMA adduct and aromatic polyamine is illustrated in the following reaction schematic:

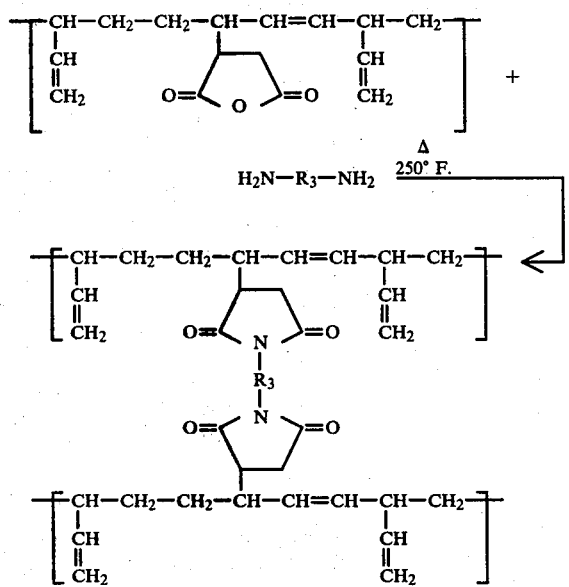

The resulting vinyl polybutadiene bisimide (PBBI) prepolymer can be cured through the pendant vinyl groups by heating the PBBI prepolymer in the presence of a high temperature free radical initiator to a temperature of at least about 300° F. The free radical initiators are as defined above.

With reference to FIG. 3, a high vinyl polybutadiene (PB) polymer is reacted with maleic anhydride (MA) in a suitable solvent such as xylene, ethyl benzene and the like at about 400° F. There is formed a vinyl polybutadiene maleic anhydride adduct wherein the maleic anhydride has reacted with the 1,4 polybutadiene segments of the PB polymer. A laminating resin is prepared by mixing a high temperature free radical initiator and an aromatic polyamine with the PBMA adduct. The free radical initiator is present in a sufficient amount to cure the copolymer resin formed, generally in from about 2 to about 20%, preferably from about 2 to about 10% by weight of the PBMA adduct and aromatic polyamine. Reinforcing fiber is added to the laminating resin and the mixture is heated to about 250° F. At this preferred temperature the aromatic polyamine reacts with the PBMA adduct to form a bisimide cross-link between vinyl polybutadiene backbone structure, i.e., a PBBI prepolymer is formed. This PBBI prepolymer containing reinforcing fiber can be used to prepare prepreg tape which can be layered to form a lay-up. The prepreg tape and therefore the PBBI is cured by heating the mixture to at least about 300° F. to form a cured composite panel. The curing reaction catalyzed by the high temperature free radical initiator provides cross-linking between the vinyl pendant groups on the vinyl polybutadiene backbone structures. Although the free radical initiator for the curing is present in the laminating resin, there is no appreciable cross-linking of the pendant vinyl groups until the mixture is heated to at least about 300° F. The cross-linking is, therefore, formed in stages, the bisimide cross-linkage at about 250° F. and subsequently the vinyl pendant group cross-linkages at at least about 300° F.

The vinyl polybutadiene bisimide resins of this invention exhibit improved moisture resistance when employed in composite materials. It is known that the hydrophobic character of a resin is related to its total oxygen content. This, in turn, is related to the strength loss of the composite material when fully saturated. Therefore, it is highly desirable to minimize the oxygen content of a resin system to increase the wet strength of the composite material. Consequently, it is desirable to keep the ratio of vinyl polybutadiene to bisimide in the copolymer as high as possible in order to obtain optimum hydrophobicity. However, vinyl polybutadiene bisimide resins exhibit greatest dry strength retention when the vinyl polybutadiene to bisimide ratio is lower. One must, therefore, balance the ratio of vinyl polybutadiene to bisimide to obtain the optimum moisture resistance and dry strength characteristics. The resin formed by the in situ method is limited in amount of cross-linkages and, therefore, bisimide as the linkage forms on the 1,4 polybutadiene segments. The concentration of bisimide, therefore, has an upper limit. FIG. 1 shows the strength retention of the resins of this invention in comparison with the molar ratio of bisimide to vinyl polybutadiene.

The invention is further illustrated by the following examples which are not intended to be limiting.

EXAMPLE 1

Preparation of the bisimide of methylene dianiline (Bis(4-maleimidophenyl)Methane)

To a stirred solution of 98 parts by weight of maleic anhydride in 700 parts of chloroform was added a solution of 99 parts of methylene dianiline in 600 parts of chloroform with cooling so that the temperature was maintained at 15°–20° C. The mixture was stirred for two hours, then the bright yellow precipitate of amide acid was collected by filtration, washed well with chloroform and air dried. The dried amide acid was mixed with 300 parts of acetic anhydride and 20 parts of anhydrous sodium acetate. The slurry was heated to 90° C., whereupon a clear yellow solution was obtained. The heat was removed and an exothermic reaction occurred. The stirred mixture was allowed to cool to room temperature and then added to 800 parts of cold ethanol. The precipitated bismaleimide was collected by filtration and washed with ethanol. Recrystallization of the crude product from aqueous dioxane yielded 94 g of nearly colorless bismaleimide, mp 155°–158° C.

EXAMPLE 2

The prepolymer method of forming a resin of this invention was practiced in the following manner.

A non-terminated vinyl polybutadiene containing about 90% 1,2 polybutadiene segments and having a molecular weight of about 3,000 was mixed with a bisimide of methylene dianiline as prepared in Example 1 in about a 2:1 molar ratio in xylene. The mixture was heated to 250° F. and t-butyl perbenzoate was added to initiate the reaction between the bisimide and the vinyl polybutadiene.

The mixture began to gel in about 7 minutes. The temperature was maintained between 248° F. and 266° F. for 30 minutes. After the 30 minute period the mixture had gelled to form a vinyl polybutadiene bisimide resin.

A prepreg tape was prepared by combining 100 parts by weight (pbw) of the above prepared resin, 2-6 pbw of 2,5-dimethyl-2,5-di(t-butylperoxy)hexane as the free radical initiator for pendant vinyl curing, 670 pbw toluene, and 605 pbw acetone. Composite graphite panels were then molded using the prepreg tape. The measured shear strength values of the panels were about 7 Ksi.

EXAMPLE 3

The procedure of Example 2 was repeated in all essential details except the vinyl polybutadiene prepolymer was carboxy terminated, contained about 90% 1,2 polybutadiene segments and had a molecular weight of about 1,000. The solvent used to form the resin was toluene rather than xylene. A clear solution was obtained under the reaction conditions of Example 2.

A prepreg tape was prepared by dissolving 100 pbw of the vinyl polybutadiene bisimide prepolymer and 2.6 pbw 2,5-dimethyl-2,5-di(t-butylperoxy)hexane in 604 pbw acetone. A coupling agent for the resin and the graphite fiber of 5 pbw epoxy novalac was added. An epoxide accelerator catalyst, 0.6 pbw chromium octoate, was added to the resin to promote both epoxidecarboxyl curing reactions. Hercules A-S graphite fiber was used in the tape as the composite and two composite panels were molded.

The first composite panel had a 210 Ksi flexural strength at room temperature with 78% strength retention at 350° F. The second panel was cured for 16 hours more than the first at 500° F. The second panel provided a flexural strength of 230 Ksi at room temperature with a 65% strength retention at 350° F. Both panels provided shear strength values of 9 Ksi at room temperature.

EXAMPLE 4

The in situ method of preparing a resin of this invention was practiced in the following manner.

The addition of maleic anhydride to the backbone unsaturation of the 1,4 polybutadiene segments to form a vinyl polybutadiene maleic anhydride adduct was accomplished by refluxing a mixture consisting of a nonterminated vinyl polybutadiene of about 90% 1,2 polybutadiene segments and having a molecular weight of about 3,000 maleic anhydride and xylene. The maleic anhydride was present at a concentration of 1 mole per 1,4 polybutadiene group. The mixture was refluxed at about 400° F. for four hours.

Upon infrared analysis, bands at 1785 cm$^{-1}$ and 1865 cm$^{-1}$ were observed which are characteristic of a succinic anhydride group. The presence of these bands were an indication that addition of the maleic anhydride to the vinyl polybutadiene did occur.

A sample test solution was prepared of the above formed adduct and was treated with methylene dianiline. A coating was made on a glass plate. The solvent was removed by heating in an air circulating oven at 160° F. for 30 minutes and the resultant thin film was treated for curing at about 350° F. Infrared analysis indicated that cross-linking did occur through the maleic anhydride bridging.

A laminating resin was then prepared from the above formed adduct by adding 13.5 pbw diaminodiphenylsulfone to 100 pbw vinyl polybutadiene maleic anhydride adduct in 400 pbw acetone. Also added was 2.8 pbw 2,5-dimethyl-2,5-di(t-butylperoxy)hexane as the free radical initiator to cure the resin through the pendant vinyl groups.

Prepreg tape was prepared from this resin with Hercules A-S graphite fiber and a composite panel was molded. The resultant panel had a flexural strength at room temperature of about 170 Ksi. There was no loss in shear strength at 350° F. after high humidity exposure.

EXAMPLE 5

The procedure of Example 4 was repeated in all essential details except an adduct was prepared by refluxing a mixture of carboxy terminated vinyl polybutadiene having 90% 1,2 polybutadiene segments and a molecular weight of about 1,000, maleic anhydride, and xylene at about 400° F. for four hours under an inert atmosphere.

Using the resultant adduct, a laminating resin was prepared by adding 14.4 pbw diaminodiphenylsulfone to 100 pbw adduct in 1,220 pbw acetone. To this solution was added 3 pbw 2,5-dimethyl-2,5-di(t-butylperoxy)hexane to cure the pendant vinyl groups of the resin. An epoxy novalac resin was added at 5 pbw as a coupling agent and 1 pbw chromium octoate as an epoxide accelerator catalyst was added to catalyze the carboxyl-epoxide reactions.

Prepreg tape was prepared from this resin with Hercules A-S graphite fiber and a composite panel was molded. The flexural and shear strength values for this panel were 190 Ksi and 9 Ksi respectively and the strength retention values at 350° F. were about 60%.

EXAMPLE 6

The procedure of Example 3 was repeated in all essential details except the vinyl polybutadiene used was carboxy terminated and had a molecular weight of about 2,000.

The bisimide of methylene dianiline prepared as in Example 1 was first wet ground in isopropyl alcohol and then mixed with the other constituents. The mixture consisted of 100 pbw of the vinyl polybutadiene, 20 pbw of the bisimide, 6 pbw epoxy novalac, 2.5 pbw t-butyl perbenzoate, 6.3 pbw 2,5-dimethyl-2,5-di(t-butylperoxy)-hexane and 0.6 pbw chromium octoate. Solvent removal was accomplished by vacuum distillation and vacuum drying at 150° F. After the isopropyl alcohol was removed, 714 pbw methyl ethyl ketone was added to facilitate preparation of prepreg tape by drum winding.

Composite panels were formed from the prepreg tape and Hercules A-S graphite fiber. Flexural strength values at room temperature for these composite panels were about 200 to 230 Ksi. The shear strength values were about 7 Ksi to about 9 Ksi.

EXAMPLE 7

The procedure of Example 6 was repeated in all essential details with the exception that the constituents of the resin consisted of 100 pbw of the vinyl polybutadiene, 30 pbw of the bisimide, 6.5 pbw epoxy novalac, 3.4 pbw t-butyl perbenzoate, 6.9 pbw 2,5-dimethyl-2,5-di(t-butylperoxy)hexane, 0.7 pbw chromium octoate and 546 pbw methyl ethyl ketone.

The composite panel formed from the resin and graphite fiber had the same properties as the composite panel of Example 6.

EXAMPLE 8

The procedure of Example 2 was repeated in all essential details except the vinyl polybutadiene was hydroxy terminated and had a molecular weight of about 2,000. An adduct was prepared by refluxing three moles of the vinyl polybutadiene with two moles of succinic anhydride in toluene with concentrated $H_2SO_4$ as a catalyst. The product was washed with deionized water and then with $Na_2CO_3$ solution. An emulsion was formed which was broken with a saturated solution of NaCL. After standing overnight, the water soluble portion of the mixture was removed. The toluene was removed at reduced pressure and by drying overnight in a vacuum oven at 180° F. to yield greater than 98% w/w resin solids.

A resin was prepared using 100 pbw of the above formed adduct, 37.5 pbw of the bisimide of methylene dianiline, 9.4 pbw epoxy novalac, 9.4 pbw 2,5-dimethyl-2,5-di(t-butylperoxy)hexane, 0.5 pbw chromium octoate and 1,120 pbw methyl ethyl ketone.

A composite panel formed from the resin and Hercules A-S graphite fiber had the following properties.

| Temperature | Flexural Strength | Shear Strength |
| --- | --- | --- |
| Room Temperature | 214 Ksi | 7.8 Ksi |
| 350° F. | 182 Ksi | 5.0 Ksi |
| 350° F. Wet | 173 Ksi | 4.7 Ksi |

What is claimed is:

1. A peroxide curable resin comprising a resin system prepared from a polybutadien having a molecular weight of about 500 and 5,000 and at least 90% 1,2-polybutadiene configuration, curable through provided pendant vinyl groups in the presence of at least one provided peroxide capable of initiating cure at a temperature of at least about 300° F., said resin system comprising a high vinyl content polybutadiene bisimide copolymer providing pendant vinyl groups and including cross-linked segments of the general structure:

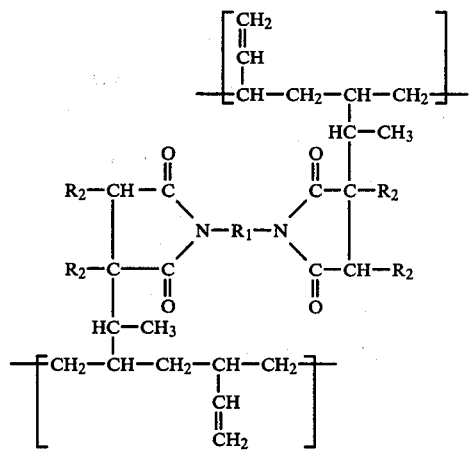

wherein $R_1$ is a difunctional benzenoid radical selected from the group consisting of:

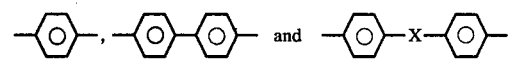

wherein X is selected from the group consisting of: $-O-$, $-S-$, $-SO_2-$, $-CH_2-$, $-C_2H_4-$, $-CO-$, $-C_3H_6-$ and

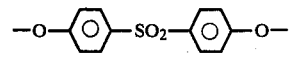

and wherein each $R_2$ is independently selected from the group consisting of hydrogen, an aliphatic group containing 1 or 2 carbon atoms, a benzenoid radical and a halogen.

2. The peroxide curable resin of claim 1 wherein $R_1$ is

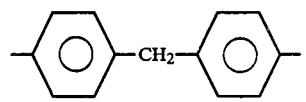

3. The peroxide curable resin of claim 2 wherein $R_2$ is hydrogen.

4. The peroxide curable resin of claim 1 wherein the vinyl polybutadiene polymer is a terminated polymer with at least one terminal group selected from the group consisting of carboxy terminal group and hydroxy terminal group.

5. A peroxide curable resin comprising a high vinyl content polybutadiene bisimide copolymer prepared from a polybutadien having a molecular weight of about 500 to 5,000 and at least 90% 1,2-polybutadiene configuration, said copolymer containing the bisimide in a molar ratio of from about 0.5 to about 3 to the high vinyl content polybutadiene, providing pendant vinyl groups and including cross-linked segments of the general structure:

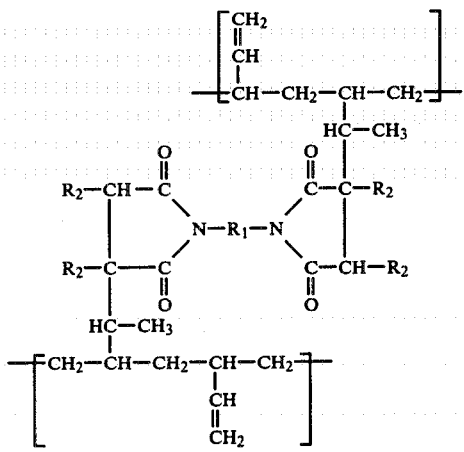

wherein $R_1$ is a difunctional benzenoid radical selected from the group consisting of:

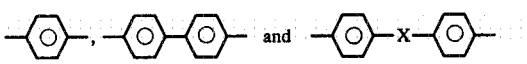

wherein X is selected from the group consisting of: —O—, —S—, —SO$_2$—, —CH$_2$—, —C$_2$H$_4$—, —CO—, —C$_3$H$_6$— and

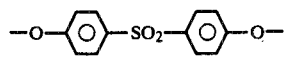

and wherein $R_2$ is independently selected from the group consisting of hydrogen, an aliphatic group containing 1 or 2 carbon atoms, a benzenoid radical and a halogen.

6. The peroxide curable resin of claim 5 wherein $R_1$ is

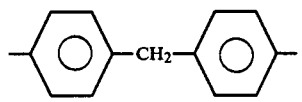

7. The peroxide curable resin of claim 6 wherein $R_2$ is hydrogen.

8. A peroxide curable resin comprising a resin system curable through provided pendant vinyl groups in the presence of at least one provided peroxide capable of initiating cure at a temperature of at least about 300° F., said resin system comprising:

(a) a high vinyl content polybutadiene bisimide copolymer prepared from a polybutadien having a molecular weight of about 500 to 5,000 and at least 90% 1,2-polybutadiene configuration, providing pendant vinyl groups and including cross-linked segments of the general structure:

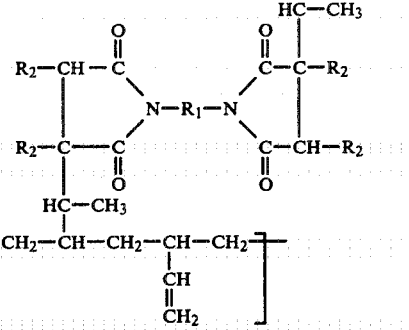

wherein $R_1$ is a difunctional benzenoid radical selected from the group consisting of:

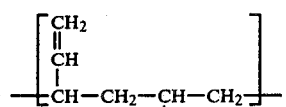

wherein X is selected from the group consisting of: —O—, —CH$_2$—, —C$_2$H$_4$—, —CO—, and —C$_3$H$_6$— and wherein $R_2$ is independently selected from the group consisting of hydrogen, an aliphatic group containing 1 or 2 carbon atoms, a benzenoid radical and a halogen.

9. The peroxide curable resin of claim 1 wherein $R_1$ is

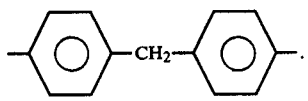

* * * * *

UNITED STATES PATENT AND TRADEMARK OFFICE
CERTIFICATE OF CORRECTION

PATENT NO. : 4,216,297
DATED : August 5, 1980
INVENTOR(S) : Robert W. Vaughan; Michael K. O'Rell; Clyde H. Sheppard It is certified that error appears in the above-identified patent and that said Letters Patent are hereby corrected as shown below:

Column 13, line 58, "and" should read -- to --.

Signed and Sealed this

Second Day of November 1982

[SEAL]

Attest:

GERALD J. MOSSINGHOFF

Attesting Officer   Commissioner of Patents and Trademarks